United States Patent
Bierman

(10) Patent No.: US 8,601,705 B2
(45) Date of Patent: Dec. 10, 2013

(54) FRAMING SPACING TOOL

(75) Inventor: Bryon J. Bierman, Primos, PA (US)

(73) Assignee: Bierdici LLC, Primos, PA (US)

( * ) Notice: Subject to any disclaimer, the term of this patent is extended or adjusted under 35 U.S.C. 154(b) by 184 days.

(21) Appl. No.: 13/312,234

(22) Filed: Dec. 6, 2011

(65) Prior Publication Data

US 2013/0139398 A1    Jun. 6, 2013

(51) Int. Cl.
   *G01D 21/00*  (2006.01)
   *G01B 5/25*   (2006.01)

(52) U.S. Cl.
   USPC ............................................................. 33/613

(58) Field of Classification Search
   USPC ................................................... 33/613, 645
   See application file for complete search history.

(56) References Cited

U.S. PATENT DOCUMENTS

| | | | | |
|---|---|---|---|---|
| 2,744,334 A | * | 5/1956 | Jondole | 33/613 |
| 3,201,874 A | * | 8/1965 | Christy | 33/613 |
| 4,625,415 A | | 12/1986 | Diamontis | |
| 6,381,908 B1 | * | 5/2002 | Fisher | 33/613 |
| 7,913,413 B2 | | 3/2011 | McHowell | |
| 2002/0194745 A1 | * | 12/2002 | Fitzpatrick et al. | 33/645 |
| 2006/0010703 A1 | * | 1/2006 | Gauthier | 33/613 |
| 2009/0100694 A1 | * | 4/2009 | Hooks | 33/645 |
| 2011/0219724 A1 | * | 9/2011 | Davis | 33/613 |
| 2013/0111775 A1 | * | 5/2013 | Davis | 33/613 |

OTHER PUBLICATIONS

Frame Master Stud Spacing Tool Website, available at http://framemaster.tripod.com/home.html, printed Nov. 16, 2011.

* cited by examiner

*Primary Examiner* — G. Bradley Bennett
(74) *Attorney, Agent, or Firm* — Volpe and Koenig, P.C.

(57) ABSTRACT

A framing spacing tool is provided having an elongated body portion with axial ends, a top surface, and an opposing bottom surface. A separate bottom guide member is associated with each of the axial ends of the body portion, each bottom guide member having a horizontal surface arranged parallel to the top surface of the body portion and at least one vertical flange that extends downwardly from the horizontal surface. A separate top guide member is associated with each of the axial ends of the body portion, each top guide member having a horizontal surface arranged parallel to the top surface of the body portion and at least one vertical flange that extends upwardly from the horizontal surface.

20 Claims, 4 Drawing Sheets

FRAMING SPACING TOOL

FIELD OF INVENTION

This application is generally related to measuring tools, and more particularly related to a spacing tool used to space apart framing material at predetermined intervals.

BACKGROUND

Framing is widely used in the construction industry to provide structural support for a wall, floor, roof, or any other building element. To form a frame, framing structural members are arranged perpendicularly and secured to each other, so that the frame can withstand loads in different directions. Frames for home construction are generally made from lumber and include two spaced apart end members, such as headers, plates, or beams, to which a plurality of parallel members are connected at a substantially perpendicular angle. The parallel members are commonly referred to as studs, joists, or rafters, and can be formed from lumber with standard thicknesses. Common sizes include 2×4, 2×3, 2×6, 2×8, 2×10, and 2×12, which refer to various nominal cross-sectional dimensions of the lumber in inches.

The studs, joists, or rafters are evenly spaced apart from each other by a predetermined distance, which is often dictated by building codes. For example, in frames for load bearing walls, the studs are usually spaced to be 16 inches on center. The term "on center" is widely used in building construction, and refers to the measurement made between the centers of two adjacent members. Accordingly, a frame that is 16 inches on center requires adjacent studs to be spaced such that the distance from the center point of one stud to the center point of an adjacent stud is substantially 16 inches. In addition to observance of building codes, forming frames with standard stud spacing (such as 16 inches on center or 24 inches on center) is necessary because the building materials to be connected to the frame (such as plywood, panels, and drywall) are often provided in standard sizes so that each end of the material lines up with the center of a stud for secure connections.

To ensure that studs are properly spaced in a frame, it is necessary to carefully measure and position the studs during construction. However, doing so is time consuming and can be challenging especially to non-professionals such as homeowners working on home improvement projects. In addition, mistakes can still be made during the measuring process, leading to uneven stud spacing and problems when plywood panels or drywall is attached to the frame. To address these issues, spacing tools have been provided to hold and space studs at standard distances from each other, such as 16 inches on center or 24 inches on center. However, the use of these spacing tools is limited where the frame includes additional studs that are not 16 inches on center, such as preexisting studs or special structural members that must be arranged at a fixed location, including for example and without limitation, jack studs, king studs, partition studs, door framing, window framing, and skylight framing. When one of these intervening members is present in a frame between two studs that must be spaced apart by a predetermined distance, known spacing tools cannot be used because the intervening member interferes with the body portion of the tool, and the spacing tool cannot be brought downward into the proper position to engage and space the studs. This may be especially problematic where the intervening member has a greater height than the studs, as the body portion of the spacing tool comes into contact with the intervening member before the guides comes into contact with the studs.

Therefore, a need exists for a framing spacing tool that can be used to easily space studs, joists, or rafters apart at regular intervals, even where an intervening member is present between the studs to be spaced apart.

SUMMARY

A framing spacing tool is disclosed that includes an elongated body portion having axial ends, a top surface, and an opposing bottom surface. A separate bottom guide member is associated with each of the axial ends of the body portion, each bottom guide member having a horizontal surface arranged parallel to the top surface of the body portion and at least one vertical flange that extends downwardly from the horizontal surface. A separate top guide member is also associated with each of the axial ends of the body portion, each top guide member having a horizontal surface arranged parallel to the top surface of the body portion and at least one vertical flange that extends upwardly from the horizontal surface.

Another framing spacing tool is disclosed, the framing spacing tool having a body portion with a longitudinal extension and left and right axial ends. A left U-shaped bottom guide member and a right U-shaped bottom guide member are associated with the left and right axial ends of the body portion. A left U-shaped top guide member and a right U-shaped top guide member are associated with and arranged in an opposite direction from the left U-shaped bottom guide member and the right U-shaped bottom guide member, respectively.

A method of spacing a plurality of framing structural members from each other is also disclosed. The method includes the steps of securing a first framing structural member to a cross member arranged substantially perpendicularly to the first framing structural member, and providing a framing spacing tool having a body portion with opposing axial ends. The framing spacing tool further includes a separate U-shaped bottom guide member associated with each of the axial ends, and a separate U-shaped top guide member associated with and arranged in an opposite direction from each one of the U-shaped bottom guide members. Each U-shaped top guide member includes a horizontal surface arranged to be substantially flush with, or spaced above, a top surface of the body portion, and two vertical flanges that extend substantially perpendicularly from the horizontal surface.

The method further includes the step of determining whether an intervening structural member is present between the first framing structural member and a position where a second framing structural member is to be secured. If an intervening structural member is not present, the framing spacing tool is arranged so that one of the U-shaped bottom guide members is arranged around the first framing structural member, such that the other one of the U-shaped bottom guide members is located at the position where the second framing structural member is to be secured. The second framing structural member is then arranged within the other one of the U-shaped bottom guide members such that the second framing structural member is substantially perpendicular to the cross member. The second framing structural member is then secured to the cross member. However, if an intervening structural member is present, the framing spacing tool is reversed and arranged so that one of the U-shaped top guide members is arranged around the first framing structural member, such that the other one of the U-shaped top guide members is located at the position where the second framing structural member is to be secured. Because the U-shaped top guide members are arranged to be substantially flush with, or spaced above, a top surface of the body portion, the body portion of the framing spacing tool does not interfere with the intervening structural member between the first and second framing structural members. In this manner, the body portion of the framing spacing tool is able to "jump" over the intervening structural member, so that the U-shaped top guide members can be used to space apart the first and second framing structural members. The second framing structural member is arranged within the other one of the U-shaped top guide members such that the second framing structural member is substantially perpendicular to the cross member. The second framing structural member is then secured to the cross member.

For sake of brevity, this summary does not list all aspects of the present tool and method, which are described in further detail below.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 1:
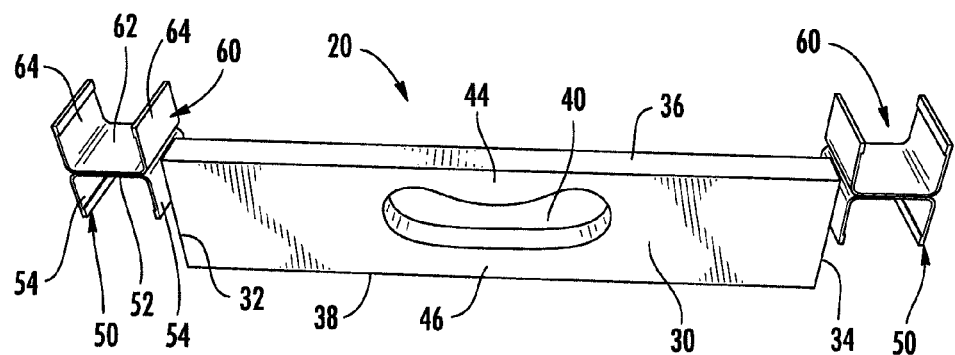
FIG. 1 is a front perspective view of an embodiment of the framing spacing tool.

Certain terminology is used in the following description for convenience only and is not limiting. The words "top," "bottom," "front," "back," "left," "right," "inner," "outer," "upper," "lower," "away," and "towards" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. The terminology includes the words specifically noted above, derivatives thereof, and words of similar import. The terms "studs," "joists," "rafters," and similar terms have specific building industry accepted definitions. However, for the purposes of describing the framing spacing tool according to the present application, the term "studs" will be used to generally refer to any two spaced apart framing elements regardless of whether they are studs, joists, rafters, or other elements.

Figure 2:
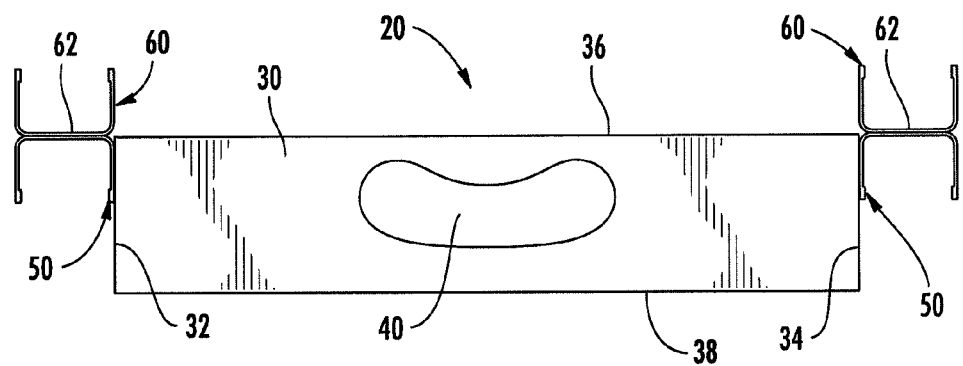
FIG. 2 is a front elevational view of the framing spacing tool shown in FIG. 1.

FIGS. 1 and 2 show one embodiment of a framing spacing tool 20 according to the present application. The framing spacing tool 20 includes an elongated body portion 30 having left and right axial ends 32, 34, a top surface 36, and a bottom surface 38. The body portion 30 can be formed as a substantially straight rectangular element, or can be curved to be more ergonomic. A separate bottom guide member 50 is associated with each of the axial ends 32, 34 of the body portion 30, each one of the bottom guide members 50 having a horizontal surface 52 arranged parallel to the top surface 36 of the body portion 30 and at least one vertical flange 54 that extends downwardly from the horizontal surface 52. A separate top guide member 60 is also associated with each of the axial ends 32, 34 of the body portion 30, each one of the top guide members 60 having a horizontal surface 62 arranged parallel to the top surface 36 of the body portion 30 and at least one vertical flange 64 that extends upwardly from the horizontal surface 62. In other words, the pair of bottom guide members 50 and the pair of top guide members 60 are arranged in opposite directions, so that the at least one vertical flange 54 of each bottom guide member 50 extends in an opposite direction from the at least one vertical flange 64 of each top guide member 60.

As used in the present application, the terms "top," "bottom," "upwardly," and "downwardly" are relative, as the surface that faces upwardly toward the user when the framing spacing tool 20 is being used changes depending on how the framing spacing tool is oriented. As discussed below in detail, the top surface 36 shown in FIGS. 1-6 faces towards the user when the framing spacing tool is used in its normal orientation where the bottom guide members 50 engage and space apart adjacent studs. However, when the framing spacing tool is reversed and used in its "jump" orientation, the bottom surface 38 becomes the "top" surface that faces toward the user. For sake of simplicity, the top surface 36 and bottom surface 38 as described herein refers to the top and bottom of the body portion 30 when the framing spacing tool is in its normal orientation as shown in FIGS. 1-6.

Figure 3:
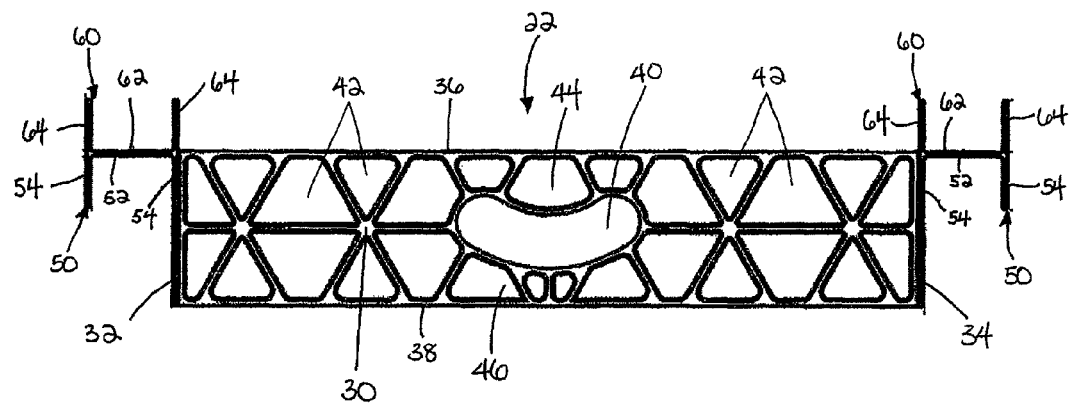
FIG. 3 is a front elevational view of an alternate embodiment of the framing spacing tool.
Figure 4:
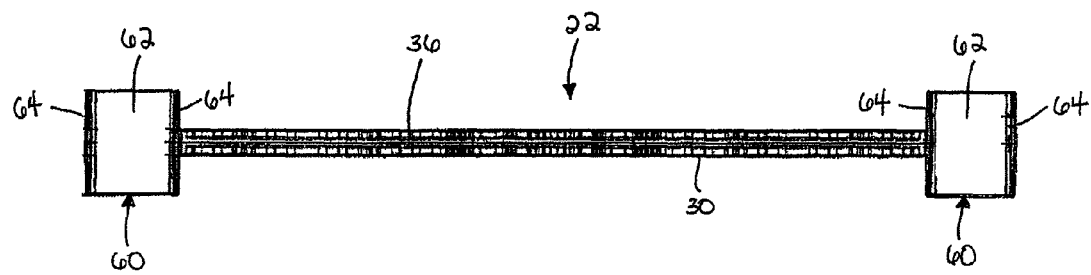
FIG. 4 is a top plan view of the framing spacing tool shown in FIG. 3.
Figure 5:
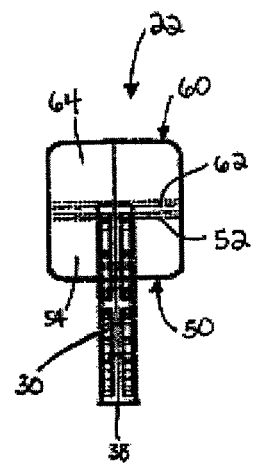
FIG. 5 is a side elevational view of the framing spacing tool shown in FIG. 3.
Figure 6:
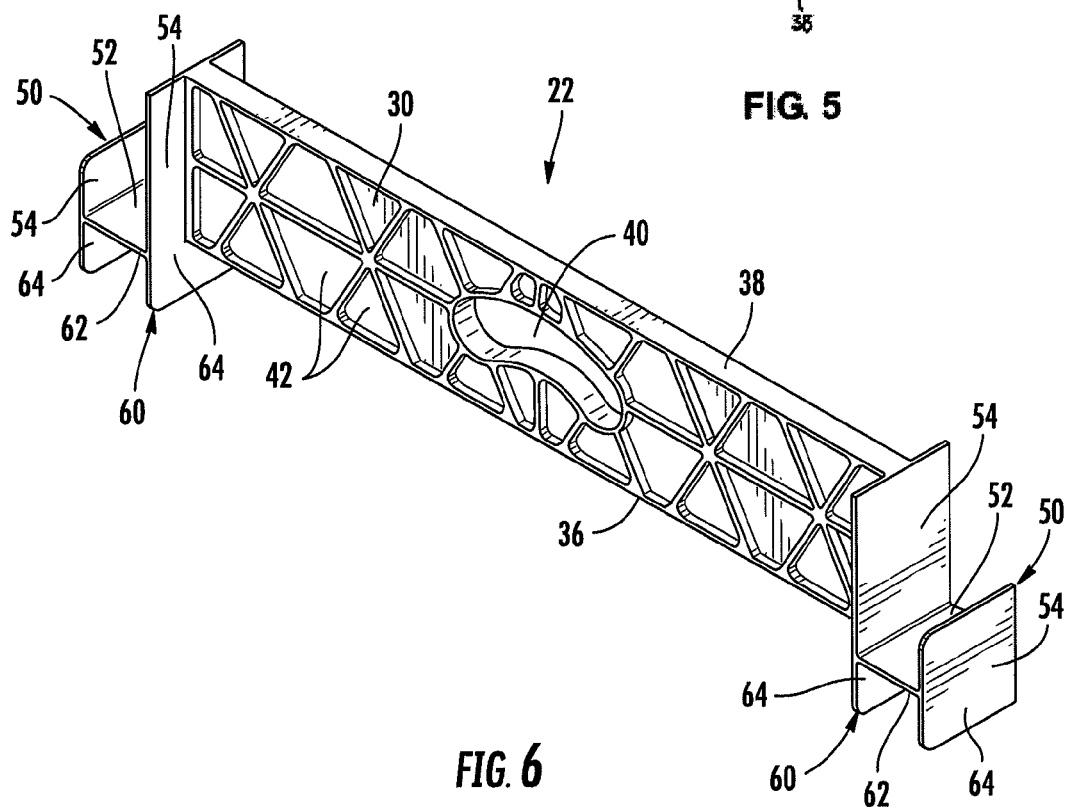
FIG. 6 is a front perspective view of the framing spacing tool shown in FIG. 3 in the "jump" orientation.

The framing spacing tool 20 preferably includes an opening 40 formed in the body portion 30 between the top surface 36 and the bottom surface 38, the opening 40 being configured to receive a user's fingers so that the user can grasp the framing spacing tool 20 during use. The opening 40 can be of any appropriate size and shape, and may be formed with a curved profile as shown in FIGS. 1-3. Furthermore, the opening 40 can be formed at approximately the midpoint of the body portion 30 between the top surface 36 and the bottom surface 38, such that a top handle portion 44 is formed between the opening 40 and the top surface 36 of the body portion 30, and a bottom handle portion 46 is formed between the opening 40 and the bottom surface 38 of the body portion 30. As shown in FIGS. 1 and 2, the body portion 30 of the framing spacing tool 20 can be made from a solid or hollow piece of material with a single opening 40 for the user to grasp. Alternatively, a plurality of openings 40 can be formed along the length of the body portion 30, so that the user can easily grasp the framing spacing tool 20 at different positions. In a further alternate embodiment of the framing spacing tool 22 shown in FIGS. 3-6, the body portion 30 of the framing spacing tool 22 can include a plurality of cutouts 42 to reduce material and weight, and to provide aesthetic appeal. For example and without limitation, the cutouts 42 formed in the body portion 30 can form a truss design, which allows a large amount of material to be removed from the body portion 30 while maintaining sufficient structural integrity. The cutouts 42 can be taken from an outer surface of the body portion 30 of the framing spacing tool 22, as shown in FIGS. 3 and 6, or alternatively can be formed as through holes that extend through the body portion 30 to further reduce material and weight.

The components of the framing spacing tool 22 shown in FIG. 3-6 are otherwise the same as those of the framing spacing tool 20 shown in FIGS. 1 and 2, and the same reference numerals are used to identify corresponding components. The body portion 30 of the framing spacing tool 20, 22 can be made from any suitable material, including for example and without limitation, lumber, aluminum, steel, stainless steel, plastic, and composite materials. Depending on the material used for the body portion 30, different methods can be used to form the body portion 30, such as through extruding, pouring, machining, injection molding, or any other process.

As shown in FIGS. 1-3 and 6, the bottom guide members 50 are preferably vertically aligned with the top guide members 60. The bottom guide members 50 can be formed separately from or integrally with the top guide members 60. The bottom guide members 50 and the top guide members 60 can be connected to each other and/or to the axial ends 32, 34 of the body portion 30 of the framing spacing tool 20, 22 by any suitable means, such as through a mechanical fastener, an adhesive, welding, or a force-fit. Any other methods may be used to associate the bottom and top guide members 50, 60 with the body portion 30 of the framing spacing tool 20, 22, the bottom and top guide members 50, 60 can even be formed integrally with the body portion 30, for example by molding the framing spacing tool 20, 22 in one piece. As shown in FIGS. 2 and 3, the horizontal surface 62 of each top guide member 60 can be arranged to be substantially flush with the top surface 36 of the body portion 30 of the framing spacing tool 20, 22. Alternatively, the horizontal surface 62 of each top guide member 60 can be arranged above the top surface 36 of the body portion 30. As discussed below in detail, this allows the framing spacing tool 20, 22 to be used in the "jump" orientation shown in FIG. 8 when spacing apart two studs with an intervening structural element in-between that would interfere with the body portion 30 of the framing spacing tool 20, 22 if it is used in the normal orientation shown in FIG. 7.

The at least one vertical flange 54, 64 of each of the bottom and top guide members 50, 60 can include two vertical flanges 54, 64 spaced apart from each other, such that each of the bottom and top guide members 50, 60 is formed as a substantially U-shaped member. The two vertical flanges 54, 64 of each of the bottom and top guide members 50, 60 are preferably spaced apart by the same distance, and configured to receive a framing structural member therebetween, such as a stud, joist, or rafter. Although most home construction utilizes frames made from lumber, the present framing spacing tool 20, 22 may be used to locate frames from other materials, such as metal studs.

The length of the body portion 30 of the framing spacing tool 20, 22 and the distance between the two vertical flanges 54, 64 of the bottom and top guide members 50, 60 can be selected to match the specific spacing standards required for a framing project, such as 16 inches on center or 24 inches on center. For example, to accommodate common stud sizes including 2×4, 2×3, 2×6, 2×8, 2×10, and 2×12, which have a nominal thickness of 1.5 inches, the two vertical flanges 54, 64 of each of the bottom and top guide members 50, 60 are spaced apart by approximately 1.5 inches so that each of the bottom and top guide members 50, 60 can receive a stud therein and hold the stud at the desired spacing during the framing operation. For frames that require such studs to be 16 inches on center, the body portion 30 of the framing spacing tool 20, 22 is formed with a length of approximately 14.5 inches, so that the distance from the center of one of the bottom guide members 50 to the center of the other one of the bottom guide members 50 is as close to 16 inches as possible.

Similarly, where the top guide members 60 are vertically aligned with the bottom guide members 50, the distance from the center of one of the top guide members 60 to the center of the other one of the top guide members 60 is also approximately 16 inches. The body portion 30 of the framing spacing tool 20, 22 can be formed with any thickness and width that is appropriate to maintain sufficient structural integrity while minimizing the overall weight and size of the tool. For example and without limitation, the body portion of a framing spacing tool 20, 22 with an overall length of 17.5 inches (including the pairs of bottom and top guide members 50, 60) to provide 16 inches on center spacing can be formed with a width of approximately 4 inches and a thickness of approximately 0.5-0.75 inches. The opening 40 formed in the body portion 30 can be sized to be approximately 3.5×1.5 inches to comfortably receive a user's fingers.

The length of the body portion 30 and the spacing between the two vertical flanges 54, 64 of the bottom and top guide members 50, 60 may be adjusted based on the size of the studs being used and the spacing requirements of the framing project, such that framing spacing tools 20, 22 of different sizes can be provided for different projects. Alternatively, the body portion 30 of the framing spacing tool 20, 22 can be formed as an adjustable element such that the same framing spacing tool 20, 22 can be used for different framing projects with different spacing between studs. For example, the body portion 30 of the framing spacing tool 20, 22 can be formed from two pieces of material that are slidably connected to each other, so that the overall length of the body portion 30 can be adjusted as necessary. To minimize user confusion and potential error, the adjustable body portion 30 can include markings that indicate when the length of the body portion 30 has been adjusted for 16 inches on center, 24 inches on center, or other common spacing requirement. The adjustable body portion 30 can also include a selective locking mechanism that prevents the length of the body portion 30 from changing during use, such as, for example and without limitation, a bayonet coupling between the two piece of material that form the body portion 30, or a set screw that can be tightened once the body portion 30 has been adjusted to the appropriate length. Furthermore, the bottom and top guide members 50, 60 can be removably connected to the body portion 30 of the framing spacing tool 20, 22 so that they can be easily switched out for bottom and top guide members 50, 60 of different sizes if studs of different thickness are used in the frame.

A typical wall frame generally includes two cross members connected by a plurality of vertical members, such as a top plate and a bottom plate secured to a plurality of perpendicular studs spaced apart at regular intervals. When constructing such a frame, the top or bottom plate is usually in place and the studs are individually secured to the top or bottom plate using mechanical fasteners such as nails or screws. The framing spacing tool 20, 22 can be used to construct a frame that is either laid down horizontally (such as a floor frame, roof frame, or a wall frame that is assembled horizontally before being stood up) or standing up vertically (such as a new or existing wall frame that is built in place). After a first stud has been secured to the top or bottom plate using any appropriate means, the framing spacing tool 20, 22 is used to position and retain an adjacent stud at an appropriate distance from the first stud, without the need for the user to make any measurements or markings. This significantly reduces user time and opportunities for error during framing projects, and is especially useful for non-professional users.

Figure 7:
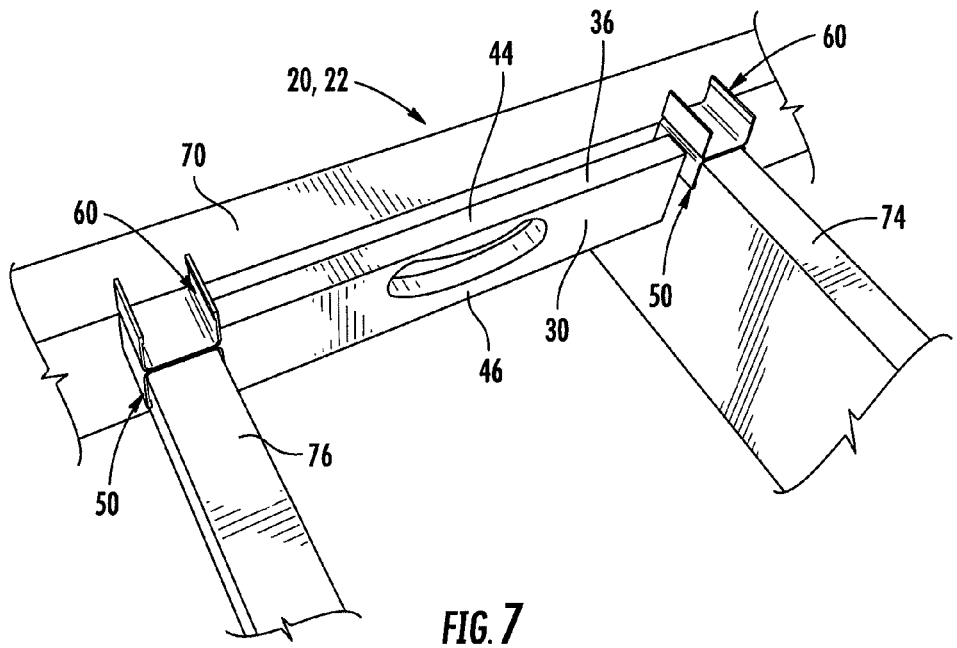
FIG. 7 is a perspective view of any one of the embodiments of the framing spacing tool used in the "normal" orientation to space apart two studs of a frame.

Referring to FIG. 7, a top plate 70 for a frame is shown. If there is no intervening structural member 78 such as a preexisting jack stud, king stud, partition stud, door framing, window framing, or skylight framing between the first stud 74 and the position where an adjacent second stud 76 is to be secured, the framing spacing tool 20, 22 can be used in the "normal" orientation where the top surface 36 of the body portion 30 faces towards the user, the top handle portion 44 can be grasped by the user, and the bottom guide members 50 are used to engage and space apart the first and second studs 74, 76. Assuming that the user is constructing the frame from right to left, after the first stud 74 has been secured to the top plate 70, the framing spacing tool 20, 22 is placed to the left of the first stud 74 so that the right bottom guide member 50 engages the top of the first stud 74. The second stud 76 can then be placed within the left bottom guide member 50 and held in place by the two vertical flanges 54 of the left bottom guide member 50 while the second stud 76 is secured to the top plate 70. No measurements are necessary, as the length of the framing spacing tool 20, 22 is selected to correspond to the required spacing between the first and second studs 74, 76. As shown in FIG. 7, when the framing spacing tool 20, 22 is used in its normal orientation, the body portion 30 extends downwardly past the top surfaces of the first and second studs 74, 76. The same process is reversed if the frame is construed from left to right.

Figure 8:
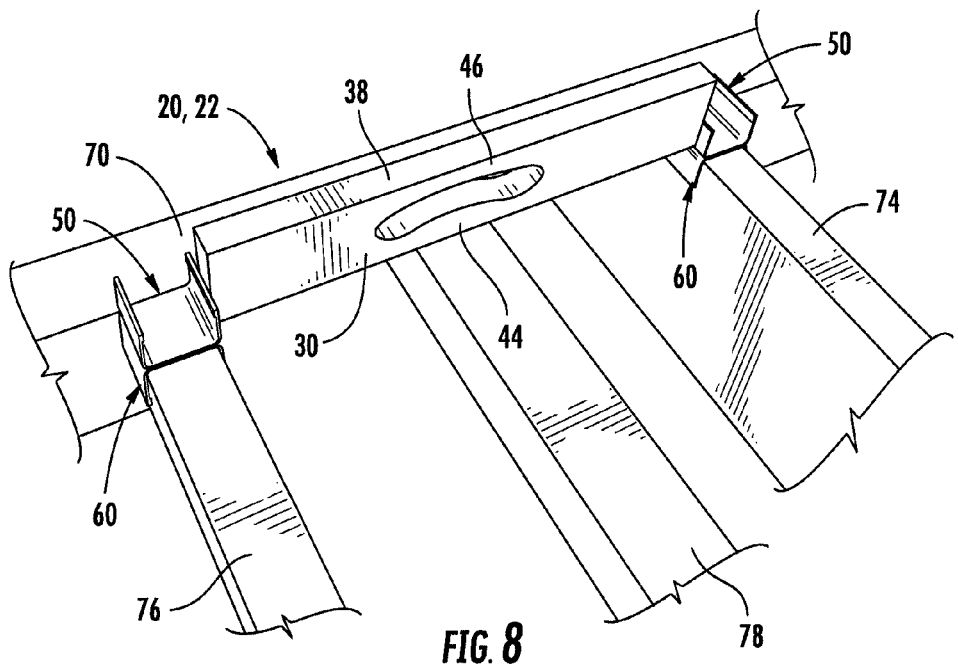
FIG. 8 is a perspective view of any one of the embodiments of the framing spacing tool used in the "jump" orientation to space apart two studs of a frame that includes an intervening structural element.

Referring to FIG. 8, if an intervening structural member is present between the first stud 74 and the position where an adjacent second stud 76 is to be secured, the framing spacing tool 20, 22 cannot be used in the normal orientation because the bottom surface 38 of the body portion 30 would hit the top of the intervening structural member, and the bottom guide members 50 would not be able to engage the first and second studs 74, 76. To accurately space the second stud 76 from the first stud 74 without having to make measurements, the framing spacing tool 20, 22 is reversed and used in the "jump" orientation where the bottom surface 38 of the body portion 30 faces towards the user, the bottom handle portion 46 can be grasped by the user, and the top guide members 60 are used to engage and space apart the first and second studs 74, 76. Again assuming that the user is constructing the frame from right to left, after the first stud 74 has been secured to the top plate 70, the framing spacing tool 20, 22 in the jump orientation is placed to the left of the first stud 74 so that the right top guide member 60 engages the top of the first stud 74. The second stud 76 can then be placed within the left top guide member 60 and held in place by the two vertical flanges 64 of the left top guide member 60 while the second stud 76 is secured to the top plate 70. Because the horizontal surface 62 of each top guide member 60 is arranged substantially flush with, or above, the top surface 36 of the body portion 30, the body portion 30 of the framing spacing tool 20, 22 can "jump" over the intervening structural member 78 arranged between the first and second studs 74, 76. This is especially useful where the user is remodeling or modifying a frame having existing studs that cannot be removed, or constructing a frame having special studs in fixed positions, such as jack studs, king studs, and partition studs. Because the body portion 30 of the framing spacing tool 20, 22 is arranged above the intervening structural member 78 in the jump orientation, there is no interference between the framing spacing tool 20, 22 and the intervening structural member 78, and the top guide members 60 can be used to properly space the first and second studs 74, 76 apart. While the jump orientation of the framing spacing tool 20, 22 allows the body portion 30 to be arranged over an intervening structural member 78, the framing spacing tool 20, 22 can be used in the jump orientation even when no intervening structural member 78 is present. The present framing spacing tool 20, 22, which can be reversed and used in a normal orientation or a jump orientation, is advantageous by allowing users to easily and accurately space and secure studs in a frame, even where intervening structural members are present between two studs. The framing spacing tool 20, 22 thus cuts down on construction time, user confusion, and opportunities for error.

A method of spacing a plurality of framing structural members from each other is also disclosed, including the following steps. A first framing structural member (such as a stud 74) is secured to a cross member (such as a top plate 70) arranged substantially perpendicular to the first framing structural member. A framing spacing tool 20, 22 is provided that includes a body portion 30 with opposing axial ends 32, 34, a separate substantially U-shaped bottom guide member 50 associated with each of the axial ends 32, 34, and a separate substantially U-shaped top guide member 60 associated with each of the U-shaped bottom guide members 50. The U-shaped top guide members 60 are arranged in an opposite direction from the U-shaped bottom guide members 50, and can be vertically aligned with the U-shaped bottom guide members 50. Each U-shaped top guide member 60 includes a horizontal surface 62 arranged substantially flush with, or spaced above, a top surface 36 of the body portion 30, and two vertical flanges 64 that extend substantially perpendicularly from the horizontal surface 62. The method further includes the step of determining whether an intervening structural member 78 is present between the first framing structural member 74 and a position where a second framing structural member 76 is to be secured. If an intervening structural member 78 is not present, the framing spacing tool 20, 22 is used in its normal orientation, and one of the U-shaped bottom guide members 50 is arranged around the first framing structural member 74 such that the other one of the U-shaped bottom guide members 50 is located at the position where the second framing structural member 76 is to be secured. The second framing structural member 76 is arranged within the other one of the U-shaped bottom guide members 50 such that the second framing structural member 76 is substantially perpendicular to the plate or cross member 70. The second framing structural member 76 is then secured to the plate or cross member 70. If an intervening structural member 78 is present between the first and second framing structural members 74, 76, the framing spacing tool 20, 22 is used in its jump orientation, and one of the U-shaped top guide members 60 is arranged around the first framing structural member 74 such that the other one of the U-shaped top guide members 60 is located at the position where the second framing structural member 76 is to be secured. The second framing structural member 76 is arranged within the other one of the U-shaped top guide members 60 such that the second framing structural member 76 is substantially perpendicular to the plate or cross member 70. The second framing structural member 76 is then secured to the plate or cross member 70. As discussed above, where an intervening structural member 78 is not present, the framing spacing tool 20, 22 can still be used in the jump orientation.

Having thus described various embodiments of the present framing spacing tool and method of spacing a plurality of framing structural members in detail, it is to be appreciated and will be apparent to those skilled in the art that many physical changes, only a few of which are exemplified in the detailed description above, could be made in the tool and method without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A framing spacing tool comprising:
    an elongated body portion having axial ends, a top surface, and an opposing bottom surface;
    a separate bottom guide member associated with each of the axial ends of the elongated body portion, each of the bottom guide members having a horizontal surface arranged parallel to the top surface of the elongated body portion and at least one vertical flange that extends downwardly from the horizontal surface; and
    a separate top guide member associated with each of the axial ends of the elongated body portion, each of the top guide members having a horizontal surface arranged parallel to the top surface of the elongated body portion and at least one vertical flange that extends upwardly from the horizontal surface.

2. The framing spacing tool of claim 1, wherein the bottom guide members are vertically aligned with the top guide members.

3. The framing spacing tool of claim 1, wherein the elongated body portion includes an opening formed between the top surface and the bottom surface, the opening being configured to be grasped by a user.

4. The framing spacing tool of claim 1, wherein the horizontal surface of each of the top guide members is arranged substantially flush with the top surface of the elongated body portion.

5. The framing spacing tool of claim 1, wherein the horizontal surface of each of the top guide members is arranged above the top surface of the elongated body portion.

6. The framing spacing tool of claim 1, wherein the at least one vertical flange of each of the bottom guide members comprises two vertical flanges spaced apart from each other, and the at least one vertical flange of each of the top guide members comprises two vertical flanges spaced apart from each other.

7. The framing spacing tool of claim 6, wherein the two vertical flanges of each of the bottom guide members and the two vertical flanges of each of the top guide members are each configured to receive a framing structural member therebetween.

8. The framing spacing tool of claim 6, wherein a center of one of the bottom guide members is spaced apart from a center of the other one of the bottom guide members by approximately 16 inches, and a center of one of the top guide members is spaced apart from a center of the other one of the top guide members by approximately 16 inches.

9. The framing spacing tool of claim 6, wherein the two vertical flanges of each of the bottom guide members are spaced apart by a predetermined distance, and the two vertical flanges of each of the top guide members are spaced apart by the same predetermined distance.

10. The framing spacing tool of claim 9, wherein the predetermined distance is approximately 1.5 inches.

11. A framing spacing tool comprising:
    a body portion having a longitudinal extension and left and right axial ends;
    a left U-shaped bottom guide member and a right U-shaped bottom guide member associated with the left and right axial ends of the body portion, respectively; and
    a left U-shaped top guide member and a right U-shaped top guide member associated with and arranged in an opposite direction from the left U-shaped bottom guide member and the right U-shaped bottom guide member, respectively.

12. The framing spacing tool of claim 11, wherein the body portion includes an opening configured to be grasped by a user.

13. The framing spacing tool of claim 11, wherein the left and right U-shaped bottom guide members are formed integrally with the left and right U-shaped top guide members, respectively.

14. The framing spacing tool of claim 11, wherein the left and right U-shaped bottom guide members are formed separately from the left and right U-shaped top guide members, respectively.

15. The framing spacing tool of claim 11, wherein the left and right U-shaped top guide members each includes a horizontal surface and two vertical flanges that extend substantially perpendicularly from the horizontal surface, the horizontal surface being arranged flush with a top surface of the body portion.

16. The framing spacing tool of claim 15, wherein the left and right U-shaped bottom guide members each includes a horizontal surface and two vertical flanges that extend substantially perpendicularly from the horizontal surface, the two vertical flanges of each of the left and right U-shaped bottom guide members being arranged to extend in an opposite direction from the two vertical flanges of each of the left and right U-shaped top guide members.

17. A method of spacing a plurality of framing structural members from each other, the method comprising the steps of:
    securing a first framing structural member to a cross member arranged substantially perpendicular to the first framing structural member;
    providing a framing spacing tool having a body portion with opposing axial ends, a separate U-shaped bottom guide member associated with each of the axial ends, and a separate U-shaped top guide member associated with and arranged in an opposite direction from each of the U-shaped bottom guide members, each of the U-shaped top guide members having a horizontal surface arranged substantially flush with, or spaced above, a top surface of the body portion, and two vertical flanges that extend substantially perpendicularly from the horizontal surface;
    determining whether an intervening structural member is present between the first framing structural member and a position where a second framing structural member is to be secured; and
    if an intervening structural member is not present, arranging one of the U-shaped bottom guide members around the first framing structural member such that the other one of the U-shaped bottom guide members is located at the position where the second framing structural member is to be secured, arranging the second framing structural member within the other one of the U-shaped bottom guide members such that the second framing structural member is substantially perpendicular to the cross member, and securing the second framing structural member to the cross member;
    if an intervening structural member is present, arranging one of the U-shaped top guide members around the first framing structural member such that the other one of the U-shaped top guide members is located at the position where the second framing structural member is to be secured, arranging the second framing structural member within the other one of the U-shaped top guide members such that the second framing structural member is substantially perpendicular to the cross member, and securing the second framing structural member to the cross member.

18. The method of claim 17, wherein the body portion of the framing spacing tool includes an opening formed between the top surface of the body portion and an opposing bottom surface, the opening being configured to be grasped by a user.

19. The method of claim 18, wherein a top handle portion is formed between the opening and the top surface of the body portion, and a bottom handle portion is formed between the opening and the bottom surface of the body portion.

20. The method of claim 19, wherein if an intervening structural member is not present, the top handle portion is grasped by the user to utilize the framing spacing tool, and if an intervening structural member is present, the bottom handle portion is grasped by the user to utilize the framing spacing tool.

* * * * *